US009124391B2

(12) United States Patent
Medbo et al.

(10) Patent No.: US 9,124,391 B2
(45) Date of Patent: *Sep. 1, 2015

(54) MOBILITY-BASED RADIO RESOURCE ASSIGNMENT METHODS, SYSTEMS AND DEVICES

(71) Applicant: Telefonaktiebolaget LM Ericsson (Publ), Stockholm (SE)

(72) Inventors: Jonas Medbo, Uppsala (SE); Yngve Selén, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/512,654

(22) Filed: Oct. 13, 2014

(65) Prior Publication Data

US 2015/0078327 A1 Mar. 19, 2015

Related U.S. Application Data

(63) Continuation of application No. 12/973,669, filed on Dec. 20, 2010, now Pat. No. 8,861,448.

(51) Int. Cl.
*H04L 5/00* (2006.01)
*H04W 72/04* (2009.01)
(Continued)

(52) U.S. Cl.
CPC ............ *H04L 5/0035* (2013.01); *H04L 5/0037* (2013.01); *H04L 5/0044* (2013.01); *H04L 5/0048* (2013.01); *H04W 8/02* (2013.01); *H04W 72/048* (2013.01); *H04L 5/0023* (2013.01); *H04W 64/006* (2013.01)

(58) Field of Classification Search
CPC ... H04L 5/0035; H04L 5/0048; H04L 5/0037; H04L 5/0044; H04L 5/0023; H04W 8/02; H04W 72/048; H04W 64/006
See application file for complete search history.

(56) References Cited

U.S. PATENT DOCUMENTS

2006/0039318 A1* 2/2006 Oh et al. ........................ 370/328
2007/0206534 A1* 9/2007 Kwun et al. .................. 370/329
(Continued)

FOREIGN PATENT DOCUMENTS

EP     1 628 498 A2     2/2006
WO    WO 00/07384 A1   2/2000

OTHER PUBLICATIONS

Notification of Transmittal of the International Search Report and the Written Opinion of the International Searching Authority, or the Declaration; International Search Report; Written Opinion of the International Searching Authority, PCT/IB2011/055110, Mar. 23, 2012.
Ericsson: "Considerations on RS Design for LTE-Advanced", 3GPP Draft; R1-090916, 3rd Generation Partnership Project (3GPP), Mobile Competence Centre; 650, Route des Lucioles; F-06921 Sophia-Antipolis Cedex; France, Athens, Greece; Feb. 4, 2009, XP050318757, retrieved on Feb. 4, 2009.
(Continued)

*Primary Examiner* — Paul H Masur
*Assistant Examiner* — Kabir Jahangir
(74) *Attorney, Agent, or Firm* — Myers Bigel Sibley & Sajovec, P.A.

(57) ABSTRACT

Mobility-based radio resource assignment methods, systems and devices can assign user equipment to different nonoverlapping groups of radio resources depending on mobility of the user equipment. The groups of radio resources are non-overlapping in time, frequency and/or code. For example, the groups of radio resources can include different pilot symbol densities, link adaptation and/or scheduling algorithms. The radio resources may be Long Term Evolution (LTE) radio resources.

25 Claims, 7 Drawing Sheets

(51) Int. Cl.
*H04W 8/02* (2009.01)
*H04W 64/00* (2009.01)

(56) References Cited

U.S. PATENT DOCUMENTS

2007/0248046 A1  10/2007  Khan
2007/0274252 A1  11/2007  Zhang et al.
2010/0080269 A1*  4/2010  Kim et al. ................. 375/211
2010/0322161 A1*  12/2010  Choi et al. ................. 370/329
2011/0199986 A1*  8/2011  Fong et al. ................. 370/329

OTHER PUBLICATIONS

Samsung: "Pilot structure in EUTRA downlink", 3GPP Draft; R1-050887 DL Pilot, 3rd Generation Partnership Project (3GPP), Mobile Competence Centre; 650, Route des Lucioles; F-06921 Sophia-Antipolis Cedex; France, RAN WG1, London, UK; Aug. 25, 2005, XP050100512, retrieved on Aug. 25, 2005.

* cited by examiner

MOBILITY-BASED RADIO RESOURCE ASSIGNMENT METHODS, SYSTEMS AND DEVICES

CROSS REFERENCE TO RELATED APPLICATION

The present application claims priority as a continuation of U.S. patent application Ser. No. 12/973,669, filed Dec. 20, 2010, now issued as U.S. Pat. No. 8,861,448, the entire content of which is incorporated herein by reference as if set forth in its entirety.

BACKGROUND

Various embodiments described herein relate to radio frequency communications and, more particularly, to wireless communication networks and devices, and methods of operating same.

Wireless communication networks are increasingly being used for wireless communication with various types of User Equipment (UE). The wireless network itself may include a plurality of space-apart nodes which define a plurality of cells, and a core network that controls the nodes and interfaces the nodes with other wired and/or wireless networks. The nodes may be terrestrial and/or space-based. The nodes communicate with the user equipment using radio resources that are allocated to the wireless communications system. The radio resources may be defined in terms of time (for example, in a Time Division Multiple Access (TDMA) system), frequency (for example, in a Frequency Division Multiple Access (FDMA) system) and/or code (for example, in a Code Division Multiple Access (CDMA) system). Radio resources may be assigned to user equipment by the wireless communications system upon initial communication and may be reassigned due to, for example, movement of the user equipment, changing bandwidth requirements, changing network traffic, etc.

SUMMARY

Various embodiments described herein provide methods of assigning radio resources for wireless communication with user equipment. According to various embodiments described herein, the user equipment is assigned to a first group of radio resources or to a second group of radio resources that is nonoverlapping with the first group, depending on mobility of the user equipment. As used herein, "mobility" means a measure of the extent to which the user equipment is physically moving, and is the opposite of "stationarity".

In some embodiments, the first and second groups of radio resources are nonoverlapping in time, frequency and/or code. For example, the first and second groups of radio resources may comprise nonoverlapping carrier frequency bands. The radio resources that are assigned may comprise uplink and/or downlink radio resources. Moreover, more than two groups of radio resources may be used to provide assignment according to more than two measures of mobility. Thus, one or more other groups of radio resources may be used for assignment, depending on the mobility of the user equipment. In some embodiments, the groups of radio resources include different pilot symbol densities, link adaptation and/or scheduling algorithms.

In some embodiments, the radio resources may be Long Term Evolution (LTE) radio resources, wherein the first group of radio resources comprises a first group of carriers having a first Reference Symbol (RS) pattern per antenna, and the second group of radio resources comprises a second group of carriers that is different from the first group and having a second RS pattern per antenna that is sparser than the first RS group pattern. In other embodiments, the communication over the first group of LTE radio resources comprises utilization of a first link adaptation algorithm based on average channel knowledge and may be assigned to user equipment with high mobility, and communication over the second group of LTE radio resources comprises utilization of a second link adaptation algorithm based on instantaneous channel knowledge and may be assigned to user equipment with low mobility. In still other embodiments, communication over the first group of LTE radio resources comprises, utilization of a first scheduling algorithm based on average channel knowledge and may be assigned to user equipment with high mobility, and communication over the second group of LTE radio resources comprises utilization of a second scheduling algorithm based on instantaneous channel knowledge and may be assigned to user equipment with low mobility.

In yet other embodiments, a first user equipment with low mobility has a strong channel gain on a first part of the accessible frequency band(s) assigned to user equipment with a low mobility and a weak channel gain on a second part of the accessible frequency band(s) assigned to user equipment with low mobility, and a second user equipment with low mobility has a weak channel gain on the first part of the accessible frequency band(s) assigned to user equipment with low mobility and a strong channel gain on the second part of the accessible frequency band(s) assigned to user equipment with low mobility. This can be assessed for these user equipment since they have low mobility and the first and second user equipment are scheduled in a same time slot but at their strong carrier frequency. For two other user equipment having high mobility and operating on a group of radio resources assigned to user equipment with high mobility, this scheduling is not attempted since the uncertainty in the channel knowledge can be lower and further the channel may change more between channel estimation and utilization of the resources based on the scheduling decision, as compared to the first two user equipment with low mobility.

User equipment also may be reassigned to the second group or to first group in response to a change in the mobility of the user equipment. For example, according to some embodiments, the user equipment may be assigned to the first group of radio resources if the user equipment is stationary, and may be assigned to the second group of radio resources if the user equipment is mobile. Moreover, in some of these embodiments, the user equipment may be reassigned to the second group in response to the user equipment becoming mobile, whereas the user equipment may be retained in the second group in response to the user equipment becoming stationary. In still other embodiments, the user equipment may be reassigned to the first group in response to the user equipment becoming stationary.

Assignment and/or reassignment of radio resources to the user equipment dependent upon the mobility of the user equipment may also be accompanied by changing a signal processing algorithm that is used. Thus, in some embodiments, the user equipment may be assigned to the first group of radio resources and to a first signal processing algorithm, or to the second group of radio resources that is nonoverlapping with the first group and to a second signal processing algorithm that includes different parameters than the first signal processing algorithm, depending on the mobility of the user equipment. The first and second signal processing algorithms may be the same signal processing algorithm, such as a channel estimation algorithm, with different channel estimation parameters or may be two different signal processing algorithms, such as two different coding, decoding, modulation and/or demodulation algorithms.

Moreover, in still other embodiments, mobility-based assignment of user equipment to radio resources may also take into account the stability in time of the radio channel. In particular, in some embodiments, the user equipment is assigned to a first group of radio resources if the user equipment is stationary and a radio channel over which communications with the user equipment occurs is stable in time. The user equipment is assigned to the second group of radio resources if the user equipment is mobile or if the radio channel is varying in time. For example, stationary user equipment that is outdoors in the woods on a windy day may be assigned to the second group even though the user equipment is stationary. Thus, in some embodiments, the stationarity of the user equipment and of the channel environment may be taken into account.

Moreover, the mobility referred to herein need not be an actual mobility of the user equipment, but, rather, can be an "expected mobility" of the user equipment. The expected mobility may be dependent upon a position of the user equipment. Thus, for example, a node that is adjacent a high-speed highway may use a first group of radio resources to communicate with user equipment, whereas a node that is remote from a high-speed highway may use a second group of radio resources to communicate with user equipment, such that the node that is adjacent the highway may expect the user equipment to be highly mobile, whereas the node that is remote from the highway may expect the user equipment to be less mobile or even stationary.

Finally, in any of the embodiments described herein, after assigning the user equipment to the first or second group of radio resources, wireless communications with the user equipment may take place using the radio resources that were assigned.

Various embodiments have been described above in connection with methods of assigning radio resources for wireless communication with user equipment. However, analogous systems for assigning radio resources for wireless communication with user equipment may also be provided. Moreover, a node of the wireless communication system may also be provided, wherein the node includes a radio transceiver and a processor that is configured to assign the user equipment to a first group of radio resources of the radio transceiver or to a second group of radio resources of the radio transceiver that is nonoverlapping with the first group, depending on the mobility of the user equipment. Finally, wireless user equipment itself may be provided that includes a radio transceiver and a processor that is configured to communicate with a node of a wireless communications system using a first group of radio resources of the radio transceiver or a second group of radio resources of the radio transceiver that is nonoverlapping with the first group, depending on the mobility of the user equipment. Various embodiments regarding the radio resources, assigning or reassigning, the use of different signal processing/scheduling algorithms and/or expected mobility as were described above may also be provided for the system, node and/or the user equipment.

DETAILED DESCRIPTION

Figure 1:
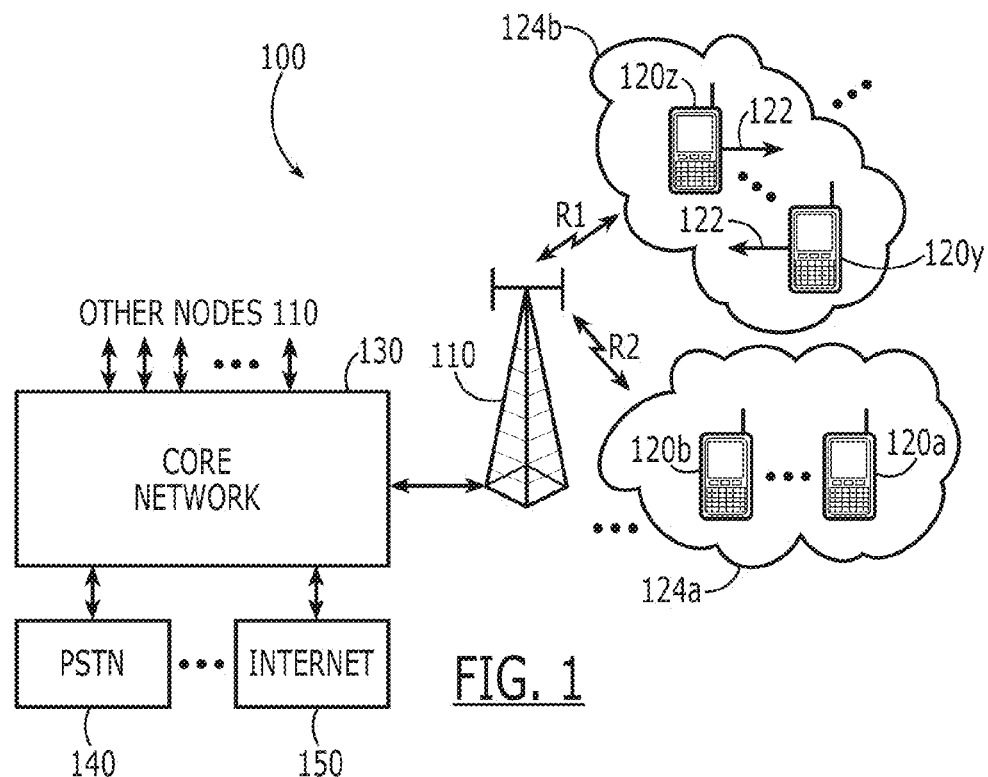
FIG. 1 is a block diagram of methods, systems, nodes and/or user equipment for assigning radio resources for wireless communication according to various embodiments described herein.

FIG. 1 is a block diagram of methods, systems, nodes and/or user equipment for assigning radio resources for wireless communications according to various embodiments described herein. Referring now to FIG. 1, a wireless communications network or system 100 may include a plurality of nodes, such as node 110, that wirelessly communicate with a plurality of user equipment, collectively designated herein as 120, according to various embodiments described herein. The node 110 communicates with a core network 130, which itself may be configured to communicate with other nodes 110 and/or to communicate with other communication networks, such as the Public Switched Telephone Network(s) (PSTN) 140, the Internet 150, etc. The functionalities of the core network 130 and/or the node(s) 110 may be provided at a single site separate from nodes 110, distributed across different sites separate from nodes 110, distributed among the nodes 110, distributed among the nodes 110 and one or more sites separate from the nodes 110, etc. A node 110 itself may also be centralized at a single site or distributed among multiple sites.

As also illustrated in FIG. 1, some of the user equipment 120$y$, 120$z$ may be more mobile than other user equipment 120$a$, 120$b$, as indicated by the mobility arrows 122 for user equipment 120$y$, 120$z$. It will be understood that user equipment 120$y$, 120$z$ need not be traveling at the same speed and/or in the same direction, and that user equipment 120$a$, 120$b$ need not be stationary. According to various embodiments described herein, user equipment 120 is grouped into two groups 124$a$, 124$b$ depending upon the mobility of the user equipment. It will also be understood that in FIG. 1, the two groups 124$a$, 124$b$ are shown as being geographically nonoverlapping for ease of illustration. However, the groups may be at least partially geographically overlapping or fully geographically overlapping in other embodiments, depending upon the locations and the mobility of the various user equipment.

As illustrated in FIG. 1, user equipment 120 is assigned to a first group of radio resources R1, or to a second group of radio resources R2 that is nonoverlapping with the first group of radio resources R1, depending upon the mobility of the user equipment 120. Thus, more mobile user equipment 120$y$, 120$z$ is assigned to a first group of radio resources R1 and less mobile (or stationary) user equipment 120$a$, 120$b$ is assigned to the second group of radio resources R2.

The assignment of user equipment to the first or second group of radio resources may be static in that it remains the same for the duration of a communication (voice and/or data) session, or may be dynamic in that it changes during a communication session depending on a change in the mobility of the user equipment. Moreover, the mobility dividing line between the two groups 124a, 124b may be static in that it does not change over time, or may be dynamic depending upon the number and/or characteristics of the user equipment 120 that is communicating with the node 110 at a given time. Thus, for example, in some embodiments, the first group 124a may be assigned to user equipment that is stationary or not moving, and the second group 124b may be assigned to user equipment that is not stationary or is moving. In other embodiments, the first group may comprise user equipment that is stationary or moving slowly (for example, corresponding to a user equipment user who is on foot), whereas the second group 124b may correspond to users who are moving faster (for example, users who are in a vehicle).

Moreover, more than two groups may be used according to various embodiments described herein. Thus, for example, a first group may correspond to stationary user equipment, a second group may correspond to user equipment that is moving at low speed (for example, a user is on foot or in a slow moving vehicle), and the third group may correspond to user equipment that is in a high speed vehicle (such as a vehicle on a highway or a high speed train). Thus, one or more other groups of radio resources may be used for assignment, depending on the mobility of the user equipment.

As was described above, the first and second groups of radio resources R1 and R2 are nonoverlapping. The first and second groups of radio resources may be nonoverlapping in time (for example, where a system uses TDMA), in frequency (for example, when a system uses FDMA) and/or in code (for example, when a system uses CDMA). In some embodiments, the first and second groups of radio resources R1, R2 comprise nonoverlapping carrier frequency bands. The first and second groups of radio resources R1 and R2 may also include first and second different pilot symbol densities.

In some embodiments, the radio resources R1, R2 are LTE radio resources, and the first group of radio resources R1 may comprise a first group of carriers having a first Reference Symbol (RS) pattern per antenna, and the second group of resources R2 may comprise a second group of carriers that is different than the first group and having a second RS pattern per antenna that is sparser than the first RS pattern. In other LTE embodiments, communication over the first group of radio resources R1 comprises utilization of a first link adaptation algorithm in which average channel knowledge is used, for example for use in equipment 120y, 120z with high mobility, and communication over a second group of radio resources R2 comprises utilization of a second link adaptation algorithm in which instantaneous channel knowledge is used, for example for user equipment with low mobility. In still other LTE embodiments, communication over the first group of radio resources R1 comprises utilization of a first scheduling algorithm in which average channel knowledge is used, for example for user equipment 120y, 120z with high mobility, and communication over the second group of radio resources R2 comprises utilization of a second scheduling algorithm in which instantaneous channel knowledge is used, for example for user equipment 120a, 120b with low mobility.

In yet other embodiments, a first user equipment with low mobility has a strong estimated channel gain on a first part of the accessible frequency band(s) assigned to user equipment with a low mobility and a weak estimated channel gain on a second part of the accessible frequency band(s) assigned to user equipment with low mobility, and a second user equipment with low mobility has a weak estimated channel gain on the first part of the accessible frequency band(s) assigned to user equipment with low mobility and a strong estimated channel gain on the second part of the accessible frequency band(s) assigned to user equipment with low mobility. This can be assessed for these user equipment since they have low mobility and the first and second user equipment are scheduled in a same time slot but at their strong carrier frequency. For two other user equipment having high mobility and operating on a group of radio resources assigned to user equipment with high mobility, this scheduling is not attempted since the uncertainty in the channel knowledge can be higher and further the channel may change more between channel estimation and utilization of the resources based on the scheduling decision, as compared to the first two user equipment with low mobility. These LTE embodiments will be described in greater detail below in connection with FIGS. 9-12.

Moreover, in still other embodiments, mobility-based assignment of user equipment to radio resources may also take into account the stability in time of the radio channel. In particular, in some embodiments, the user equipment is assigned to a first group of radio resources if the user equipment is stationary and a radio channel over which communications with the user equipment occurs is stable in time. The user equipment is assigned to the second group of radio resources if the user equipment is mobile or if the radio channel is varying in time. For example, stationary user equipment that is outdoors in the woods on a windy day may be assigned to the second group even though the user equipment is stationary. Thus, in some embodiments, the stationarity of the user equipment and of the channel environment may be taken into account.

Finally, any and all embodiments described herein may assign radio resources independently for uplink (communication from user equipment 120 to node 110) and downlink (communication from node 110 to user equipment 120) resources, or may use the same radio resource assignment for both uplink and downlink radio resources.

Figure 2:
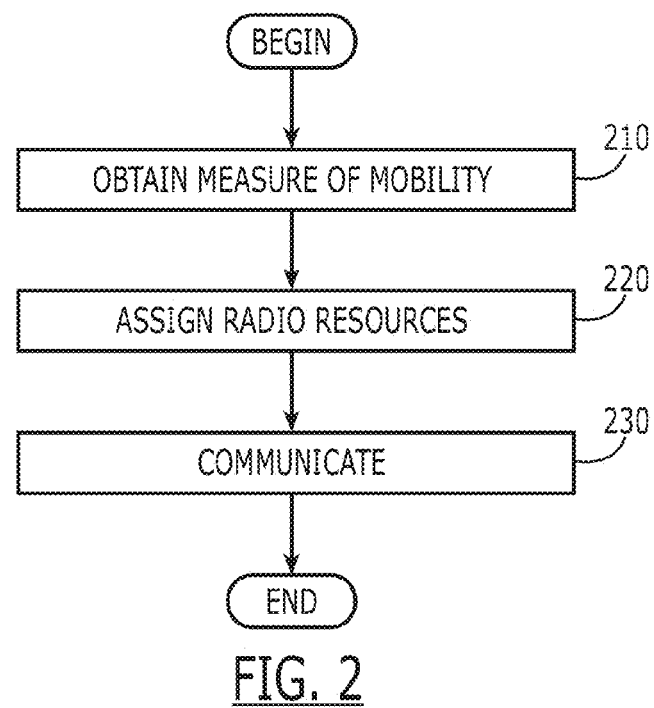
FIGS. 2-5 are flowcharts of operations that may be performed to assign radio resources for wireless communication with user equipment according to various embodiments described herein.

FIG. 2 is a flowchart of operations that may be performed to assign radio resources for wireless communication with user equipment according to various embodiments described herein. These operations may be performed by the node 110, the core network 130, the user equipment 120, and/or any other element of the communications system 100 of FIG. 1.

Referring now to FIG. 2, a measure of mobility of the user equipment 120 is first obtained. Measurements of mobility may be obtained from a Doppler spread for the user equipment, differences in the estimated channels over time and/or various position-determining techniques, such as GPS and/or wireless network-based position determining techniques. Mobility may be estimated by the user equipment 120 and reported to the core network 130 and/or may be estimated directly by the core network 130 using measurements that may be taken at the various nodes 110 and/or using other techniques.

Referring now to Block 220, the various user equipment are assigned to a first, second, third, etc. group of radio resources that are nonoverlapping, depending on the mobility of the user equipment. Various groupings may be used as was described above in connection with FIG. 1. Moreover, these groupings may vary with time and/or may apply to the uplink and/or downlink communications. Finally, referring to FIG. 2, at Block 230, communications are performed with the user equipment using the radio resources that were assigned.

Figure 3:
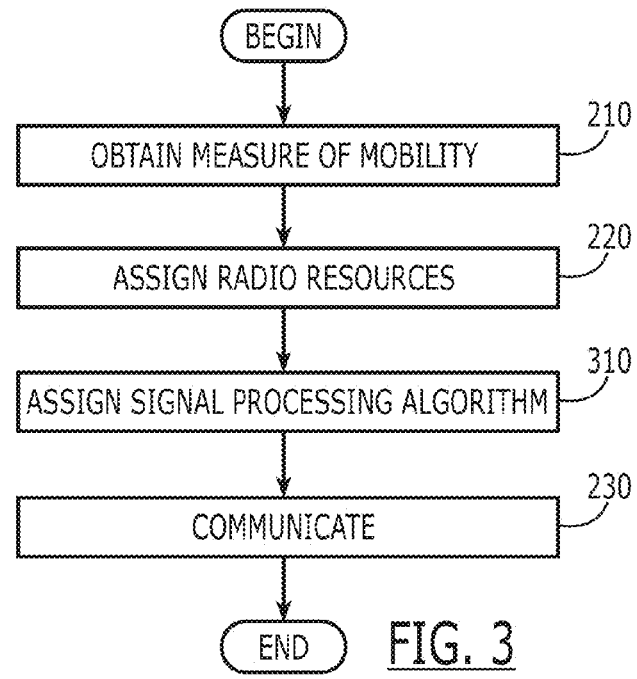

FIG. 3 is a flowchart of operations that may be performed to assign radio resources according to various other embodiments described. Referring to FIG. 3, operations at Blocks 210 and 220 of FIG. 2 are performed. Then, at Block 310, a signal processing algorithm is also assigned to the groups of user equipment. More specifically, user equipment is assigned to a first group of radio resources and to a first signal processing algorithm or to a second group of radio resources that is nonoverlapping with the first group and to a second signal processing algorithm that includes different parameters than the first signal processing algorithm, depending on the mobility of the user equipment. As was described above, in some embodiments, the same signal processing algorithm, such as a given channel estimation algorithm, may be used, with different input parameters, such as different Doppler values. In other embodiments, two different signal processing algorithms, such as two different coding/decoding/modulation/demodulation algorithms, may be used. Accordingly, techniques for changing signal processing algorithm parameters based on mobility of the user equipment may be coupled with changing the radio resources based on the mobility of the user equipment, according to various embodiments described herein.

Figure 4:
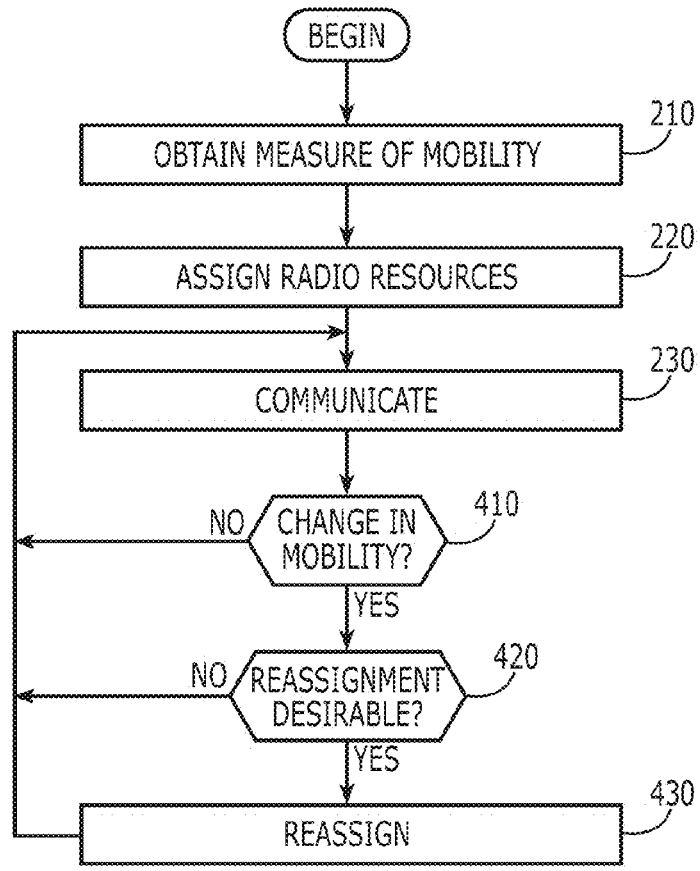

FIG. 4 is a flowchart of operations that may be used to assign radio resources according to other embodiments. Referring to FIG. 4, operations of Blocks and 210, 220 and 230 are performed. Then, at Block 410, a determination is made as to whether a change in mobility has occurred for one or more of the user equipment, so as to cause assignment of this user equipment to potentially move from one of the groups of radio resources to another one of the groups. For example, user equipment may change from stationary to mobile or from mobile to stationary. At Block 420, a determination is made as to whether a reassignment should be performed, i.e., whether a reassignment is desirable. For example, in some embodiments, even though user equipment has moved from the mobile group to the stationary group, or from the stationary group to the mobile group, reassignment may not be desirable during a communication session. Alternatively, the load on one or the other group may make it less desirable to reassign user equipment. Referring to Block 430, if it is desirable to reassign, the reassignment takes place, and communication continues at Block 230 in the reassigned group.

Figure 5:
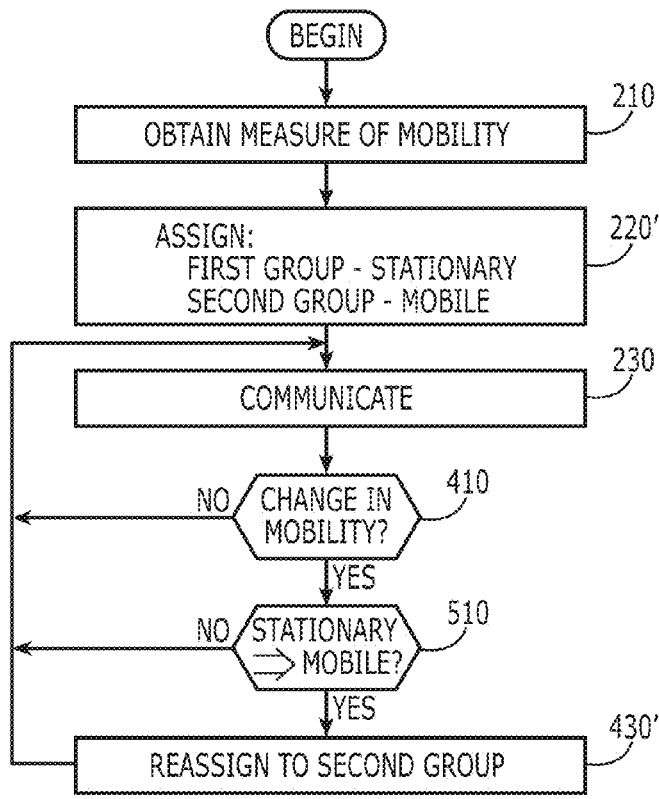

FIG. 5 is a flowchart illustrating an example of assignment and reassignment, as was generally described in FIG. 4. Referring to FIG. 5, a measure of mobility is obtained at Block 210, and at Block 220', the user equipment is assigned to the first group if the user equipment is stationary, and is assigned to the second group if the user equipment is mobile. Communication then takes place at Block 230. Then, at Block 410, a change in mobility is detected. At Block 510, if the change in mobility is from stationary to mobile (i.e., the user equipment has become mobile), then at Block 430', the user equipment is reassigned to the second group in response to the user equipment becoming mobile. On the other hand, if, at Block 510, the change is from mobile to stationary (i.e., the user equipment has become stationary), the user equipment may be retained in the second group in response to the user equipment becoming stationary. Accordingly, embodiments of FIG. 5 illustrate an "asymmetric reassignment" wherein, for example, reassignment takes place when user equipment becomes mobile, but reassignment does not take place when user equipment becomes stationary.

Figure 6:
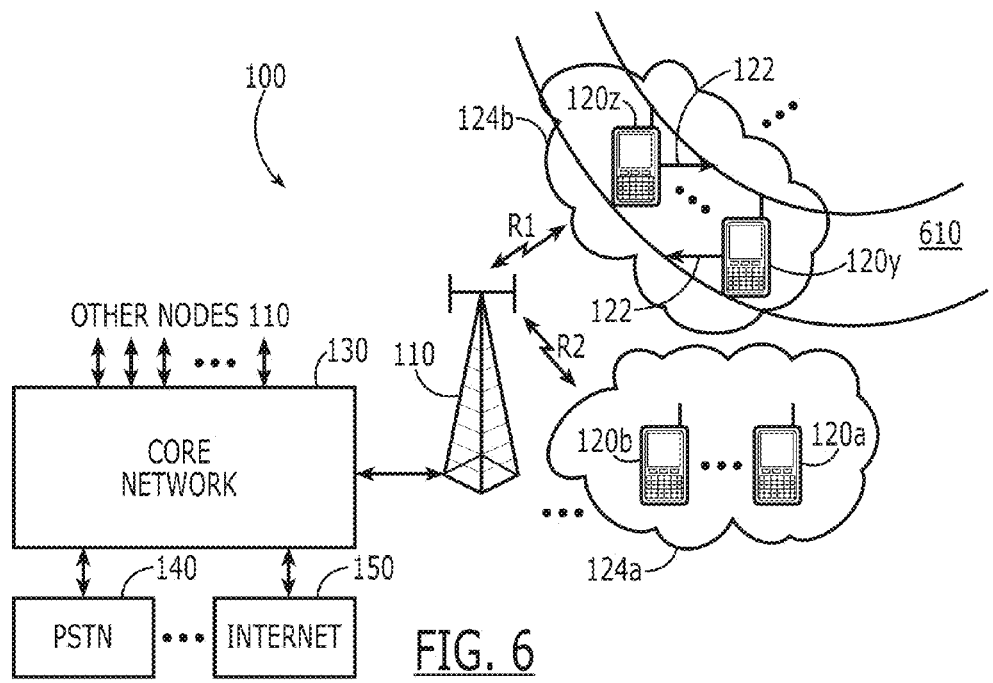
FIG. 6 is a block diagram of methods, systems, nodes and/or user equipment for assigning radio resources for wireless communication according to various other embodiments described herein.

Various embodiments described above have addressed actual mobility of the user equipment 120. However, other embodiments that will now be described in connection with FIG. 6 may use an "expected mobility". More specifically, FIG. 6 illustrates that some of the user equipment 120y, 120z may be located on a highway 610, whereas other user equipment 120a, 120b may be located remote from the highway 610. In these embodiments, rather than determining the actual mobility of the user equipment, the expected mobility may be determined dependent upon a position of the user equipment relative to the highway 610. User equipment that is located on the highway may be assigned to the first group of radio resources R1, whereas user equipment that is not on the highway may be assigned to the second group of radio resources R2. In other embodiments, expected mobility may be used by a node that is physically located on a bus, train, airplane or other moving vehicle. Moreover, in other embodiments, combinations of actual and expected mobility may be used to determine radio resource assignment. Changes in mobility may also be taken into account, as was already described in connection with FIGS. 4 and 5.

Figure 7:
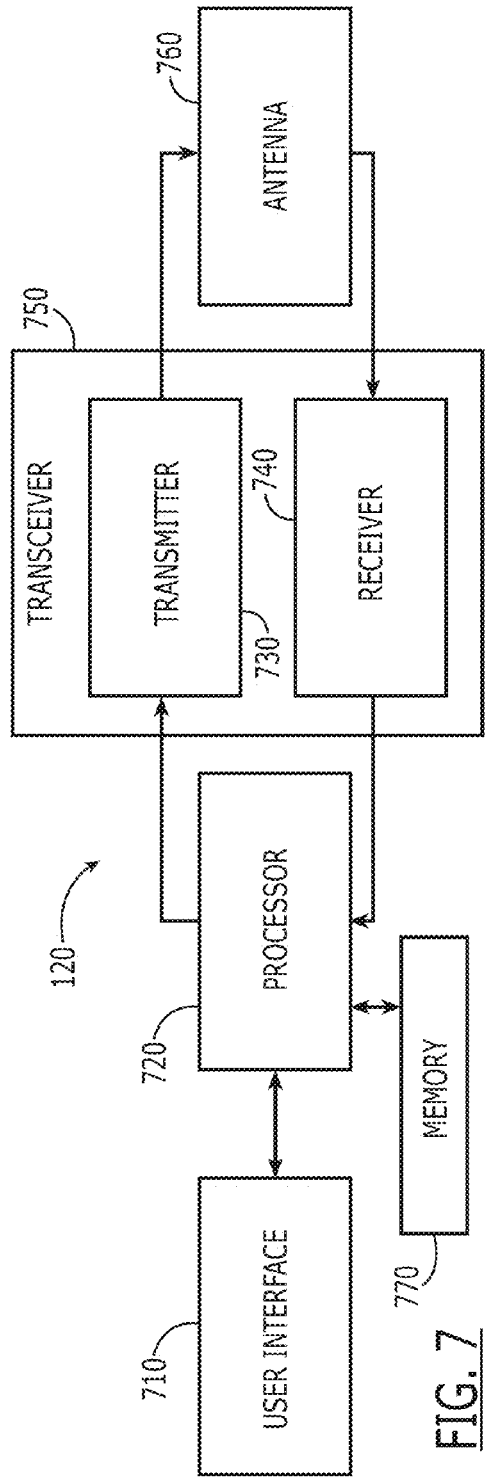
FIG. 7 is a block diagram illustrating user equipment of FIG. 1 according to various embodiments described herein.

FIG. 7 is a block diagram illustrating user equipment 120 of FIG. 1 according to various embodiments described herein. As shown, the user equipment 120 may include a processor 720, a transmitter 730, a receiver 740, an antenna 760 and a user interface 710. The transmitter 730 and receiver 740 may be at least partially combined in a transceiver 750. The antenna 760 may include one or more antennas that communicate with the transceiver 750 through one or more antenna posts. The processor 720 may process voice/data communications transmitted through the transmitter 730 and antenna 760 and received through the antenna 760 and receiver 740. The processor 720 may also be Configured to assign the user equipment 120 to a first or second group of radio resources according to any of the embodiments described herein. The assignment may be fully performed by the user equipment 120, may be performed in part by the user equipment 120 and in part by the node 110 and/or core network 130, or may be performed entirely by the node 110 and/or core network 130. The results of the assignment may be communicated to the processor 720, in which case the processor 720 may be configured to tune the transmitter 730 and/or receiver 740, and/or to perform various algorithms according to the radio resources that have been assigned. The user interface 710 may include one or more speakers, microphones, keypads, displays, touch-sensitive displays, etc., to support radiotelephone voice communication, Internet browsing, text messaging, email, etc. The receiver 740 and the antenna 760 may be further configured to receive GPS and/or other positioning signals, and the processor 720 may be configured to process these positioning signals and/or to transmit these signals through the transmitter 730 and antenna 760 to the node 110. Instructions and/or data that are used by the processor 720 may be stored in one or more memories 770.

Figure 8:
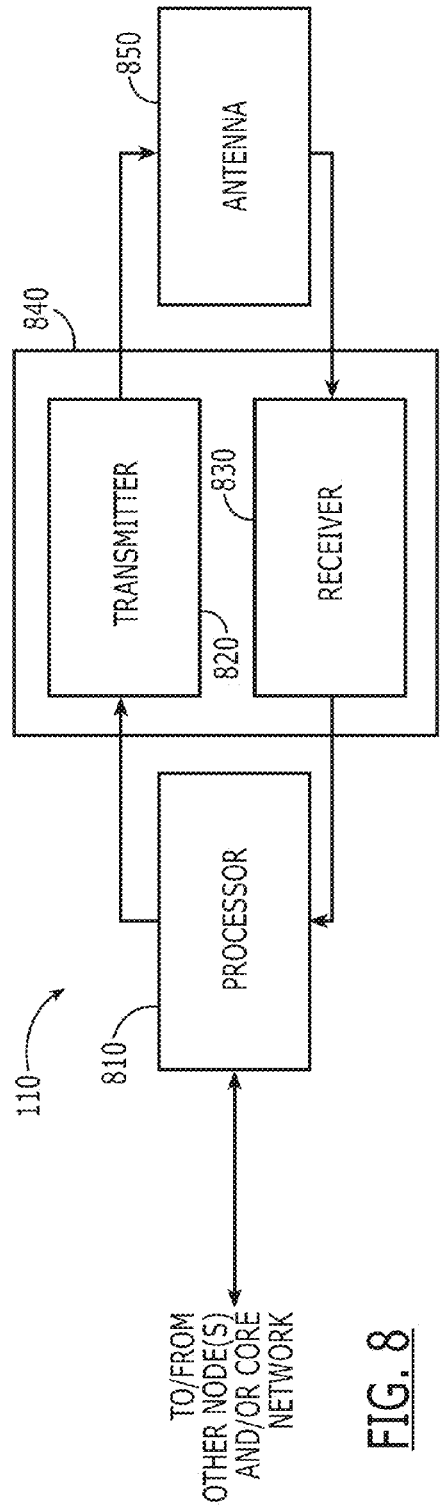
FIG. 8 is a block diagram illustrates a node of FIG. 1 according to various embodiments described herein.

FIG. 8 is a block diagram illustrating a node 110 according to various embodiments described herein. As shown, node 110 may include a processor 810, a transmitter 820, a receiver 830 and an antenna 850. The transmitter and receiver may be at leas partially combined in a transceiver 840. The antenna 850 may include one or more antennas that communicate with the transceiver 840 through one or more antenna ports. The processor 810 may be coupled to the core network 130 and/or to other nodes 110. The processor 810 may be configured to assign user equipment to a first or second group of radio resources according to any or all of the embodiments described herein. As was described herein, assignment may be determined by the node 820, by the core network 130 and/or by the user equipment 120. The processor 810 may also process voice/data communication transmitted through the transmitter 820 and antenna 850, and received through the antenna 850 and receiver 830 to support communication with a plurality or user equipment 120.

Additional discussion of various embodiments will now be provided. In particular, wireless communication networks are evolving to support a greater variability of usage. The old 1G and 2G networks were designed primarily with voice users in mind, focusing on handheld devices which are often mobile. In 3G, 4G and future networks a greater variability of devices and usage will be present, due to, for example, various machine-to-machine (M2M) usages, mobile broadband (MBB), voice, etc. It may be advantageous to design the network to be more flexible towards different usage patterns and properties of the different types of users.

Particularly, for many of the more data intensive usage types, a large proportion of the user equipment may be expected to be stationary. For example, laptop users at Internet cafes, laptop users at offices and fixed wireless reception to the home may all involve stationary user equipment. When user equipment is stationary, the channels generally become (sometimes significantly) more stationary than for mobile user equipment. This generally makes the channels easier to estimate. Moreover, the change in the channel between estimation and utilization of the channel is generally smaller.

Coordinated multipoint (CoMP) transmission is a family of techniques that can reduce interference among different user equipment by synchronizing transmission and/or reception among multiple transceivers. In coherent CoMP, channel knowledge between user equipment and spatially distributed node antennas, such as base station antennas, can be used to transmit the signals to one user equipment in (or near) the channel matrix nullspace of another user equipment. Thus, in theory, little or no interference is caused to that other user equipment. However, coherent CoMP may require full channel knowledge between different user equipment and base station antennas. If such channel knowledge is available one may use multi point precoding such that the achieved system capacity can be superior to that of a single point transmission system.

Wireless communication systems are generally designed based on a "worst case" mobility that one decides to support. For example, RSs in LTE have a fixed structure. Various embodiments described herein may arise from recognition that radio resources may typically be assigned suboptimally, since they do not account for mobility. For example, the RS overhead may be unnecessarily large for stationary user equipment. Various embodiments described herein may assign user equipment to radio resources depending on the mobility of the user equipment. Accordingly, in some embodiments, a wireless communication system/method may be adapted to the stationarity of the channels thereof.

Figure 9:
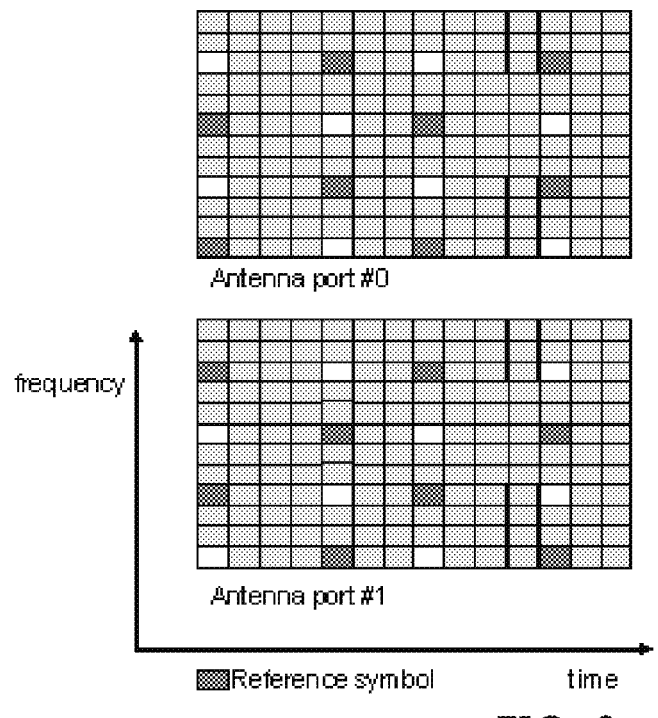
FIGS. 9-12 are time frequency grids that illustrate assigning radio resources for wireless communication with user equipment according to various embodiments described herein.

In one example, coherent CoMP generally assumes that the channels between distributed base station antennas and the user equipment antennas are known, as was described above. For the downlink in a TDD system, this channel knowledge can be obtained by user equipment sounding in the uplink assuming completely reciprocal transmission and receiving chains. However, in an FDD system or in a TDD system where the reciprocity does not hold, the user equipment estimates the channels and reports back to the system recommendations on what precoders, etc. to use. For LTE, the RSs are used by the user equipment for estimating the downlink channel. Hence, if a large number of base station antennas are to be supported for coherent CoMP transmissions, the overhead from the RS generally becomes very high since all other antennas generally need to be silent at the resource block when one antenna is transmitting a reference symbol. FIG. 9 illustrates physical radio resources on a time-frequency grid for an LTE downlink reference symbol pattern for two antenna ports of a base station. The time-frequency resources which are used for the reference symbols of one antenna port generally need to be unused for the other antenna port. In FIG. 9, and in all subsequent figures herein, each resource element is shown by a box in the time-frequency grid. A reference symbol is illustrated by a dark box, an unused resource element is illustrated by a white box, and the light boxes illustrate resource elements that can be used for other purposes, for example for as a resource element for wireless voice and/or data communications with user equipment.

User specific reference symbols which are standardized in LTE may be used for beamforming with more than four antennas. However, the user specific reference symbols are precoded and allow estimation only of the effective channel to a specific user equipment. Thus, they do not give the full channel information for coherent CoMP.

Various embodiments described herein can divide mobile and stationary user equipment orthogonally in some radio resource dimension, e.g., frequency, time and/or code. The communication system/method can then be more optimized based on the stationarity of the user equipment. For multi-carrier systems, such as LTE Release 10 and beyond, the most natural division may be in the frequency dimension by assigning user equipment to different carriers based on their degree of stationarity.

Some embodiments described herein can vary the reference symbol design for stationary vs. non-stationary user equipment. For user equipment that is stationary, a much sparser reference symbol pattern can be used than for non-stationary user equipment (since the channel is stationary for the former). This can be used for reducing the RS overhead compared to today's systems (giving slightly more resources for user data) and/or it can provide an enabler for more advanced multi-antenna techniques. A sparser reference symbol pattern enables estimation of more channels with the same channel estimation overhead (same total amount of RSs). Particularly, for multi-carrier systems, such as LTE Release 10 and beyond, one or several carriers could be reserved for stationary users and these carriers could be designed or optimized accordingly, e.g., by using a sparser reference symbol pattern per antenna, which can enable estimation of more channels without too large overhead, which in turn can enable coherent CoMP. Each carrier could then have two or more "stationarity modes" which can be adapted based on the stationarity levels of the active user equipment in the vicinity. Similarly, near freeways or train tracks carriers may be used that are designed or optimized for user equipment that has very high mobility.

In some types of areas, such as indoors (e.g., offices), the isolation to other areas can be expected to be relatively high and the user equipment is expected to be relatively stationary. In such an environment, a sparser RS pattern could be an attractive way of enabling advanced CoMP techniques.

Figure 10:
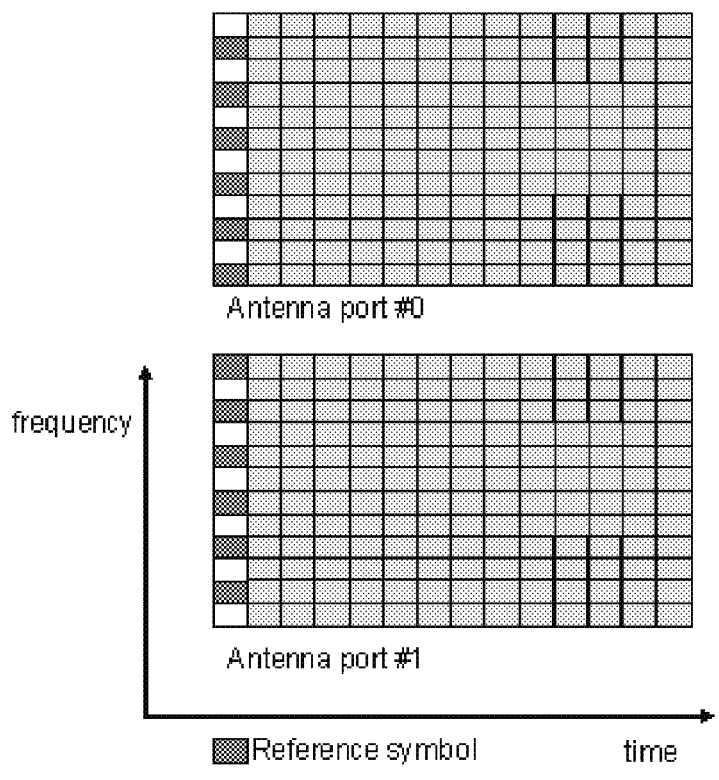

An embodiment of a sparser (in time) RS pattern is shown in FIG. 10. The illustrated embodiment has a sparser RS pattern in time and also a denser frequency pattern in frequency. The latter need not be used, but could be beneficial if the channels are expected to be very frequency selective.

Accordingly, FIG. 10 illustrates embodiments of an LTE downlink reference symbol pattern for two antennas for non-mobile (stationary) user equipment. The time-frequency resources which are used for the reference symbols of one antenna need to be unused for the other antenna. Note the sparser frequency pattern in time, compared to FIG. 9. Thus, in some embodiments, the RS pattern of FIG. 9 corresponds to the first group of radio resources R1 of FIG. 1, and is used for mobile user equipment 120y-120z, whereas the sparser RS pattern of FIG. 10 corresponds to the second group of radio resources R2 of FIG. 1, and is used for stationary user equipment 120a-120b.

Figure 11:
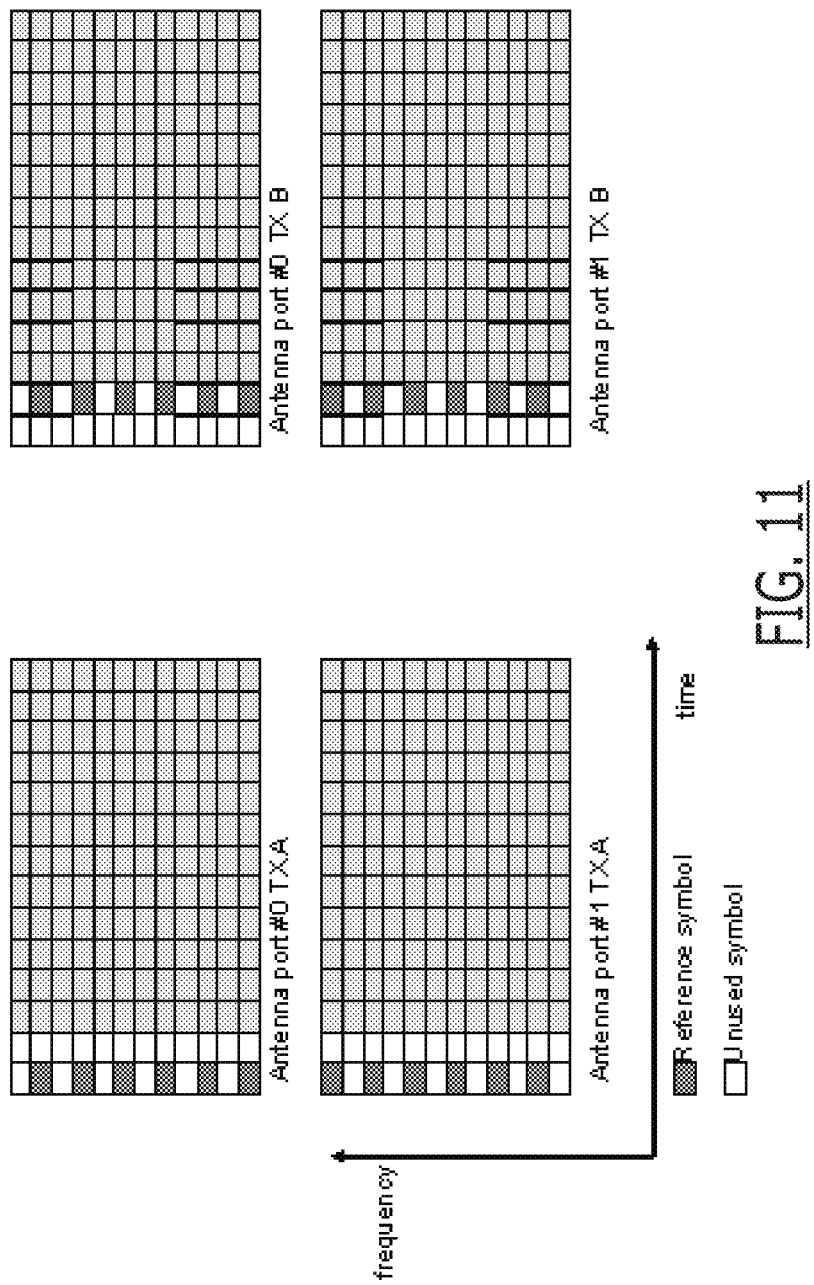

In FIG. 11, embodiments of RS patterns are shown for resource blocks where joint transmission (TX) is being used. To facilitate multiple transmitter channel estimation, the resource elements that are used to transmit RS in one transmitter are left blank by the other transmitter. This can be extendable to more than two transmitters engaging in downlink joint transmission CoMP.

Accordingly, FIG. 11 illustrates other embodiments of an LTE downlink reference symbol pattern for two antenna ports for two different transmitters A and B that use downlink joint transmission CoMP for non-mobile users. The time-frequency resources that are used for the reference symbols of one antenna are unused for the other antenna, also between the different transmitters if joint transmission is to be executed. If joint transmission is not used for certain resource blocks, the resource elements need not be blanked over the transmitters A and B (i.e., the second column can be used by TX A, and the first column can be used by TX B). Accordingly, in these embodiments, the time-frequency resources of FIG. 9 are used for the first group of radio resources R1 of FIG. 1 that are used for mobile user equipment $120y$-$120z$, whereas the time-frequency resources of FIG. 11 are used for the second group of radio resources R2 and user equipment $120a$-$120b$ of FIG. 1. Note that embodiments of RS spacing as illustrated in FIG. 11 may be applicable both to the downlink and the uplink of the wireless system.

Figure 12:
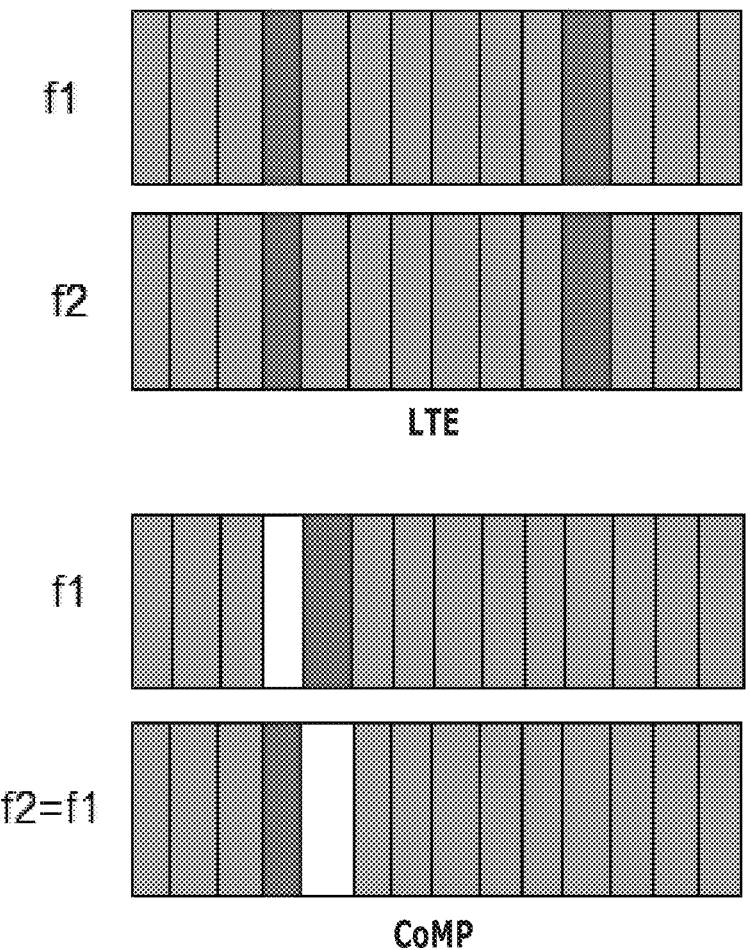

In the uplink of LTE the RS is sent in the fourth of each uplink slot. For stationary users it is possible to make a much sparser allocation allowing for an increased number of simultaneous active users utilizing the same radio resource in time and frequency. In the uplink, the RS of different users are separated in time. FIG. 12 illustrates a possible embodiment of an LTE uplink reference symbol pattern for two different transmitters 1 and 2 that use uplink joint transmission CoMP for non-mobile users. In the CoMP case both frequencies, f1 and f2, are the same.

As was noted above, the mobility of the user equipment can be determined, for example, based on Doppler spread, on differences in the estimated channels over time and/or other techniques. It may be estimated by the user equipment and reported to the system and/or estimated directly by the system.

Other embodiments relate to link adaptation. If a channel is stationary the most efficient code rate and modulation over some particular frequency resources can be found, e.g., by means of trial and error. At an early stage in a longer transmission, different combinations of modulation and code rate can be attempted and the combination giving the highest throughput can be selected. For a non-stationary channel that changes over time such an approach may not work or may not work as well, since the optimal or effective combination of modulation and code rate would change with the channel. Accordingly, various embodiments can assign different signal processing algorithms in addition to different radio resources, depending on the mobility of the user equipment.

Yet other embodiments relate to scheduling algorithms. Since a stationary channel enables instantaneous channel knowledge (i.e., the channel does not change appreciably between a measurement and the execution of a scheme based upon that measurement) it is possible to assign time-frequency resources in a more optimal way than if the channel changes. Particularly, user equipment can be assigned at frequencies where they have strong channel gains, and the user equipment which have complementing channels (i.e., one user equipment has strong channel gains on some frequencies where another user equipment has weak channel gains, and vice-versa) can be allocated at the same time instances utilizing their strong frequencies, respectively. For user equipment that has a non-stationary channel, the channel may change from the measurement time to the execution time such that this assignment scheme may not perform properly. Accordingly, such an assignment scheme may only be used on the radio resources reserved for more stationary users.

Accordingly, various embodiments described herein can provide systems, methods and devices for wireless communications which divide users orthogonally based on the user equipment mobility and adapt its transmission parameters based on the user equipment mobility. In some embodiments, the division of user equipment groups is in frequency. The frequency division may be done by assigning the user equipment to different carriers.

In some embodiments, the pilot pattern for an antenna in the system is adapted such that it is sparser in time for user equipment which has low mobility and denser in time for user equipment which has high mobility. In other embodiments, the link adaptation algorithm is adapted such that the instantaneous channel knowledge is directly used for user equipment with low mobility and average channel knowledge is used for user equipment with high mobility. In yet other embodiments, the scheduling algorithm is adapted such that the instantaneous channel knowledge is directly used for user equipment with low mobility and average channel knowledge is used for user equipment with high mobility. In still other embodiments, user equipment which has complementing channels in frequency (i.e., one user equipment has strong channel gains on some frequencies where another user equipment has weak channel gains, and vice-versa) are scheduled in the same time slots but at their strong frequencies respectively for stationary user equipment, but not for mobile user equipment.

Accordingly, a wireless communication system can be designed in a flexible way both for stationary users and mobile users.

Various embodiments were described herein with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, when an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Furthermore, "coupled", "connected", "responsive", or variants thereof as used herein may include wirelessly coupled, connected, or responsive. Like numbers refer to like elements throughout. The terminology used herein is for the purpose of describing particular embodiments only and is not intended to be limiting of the invention. As used herein, the singular forms "a", "an" and "the" are intended to include the plural forms as well, unless the context clearly indicates otherwise. Well-known functions or constructions may not be described in detail for brevity and/or clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. Moreover, as used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

As used herein, the term Radio Access Technology (RAT) may include, for example, operations in any of the following Radio Access Technologies: Advanced Mobile Phone Service (AMPS), ANSI-136, Global Standard for Mobile (GSM) communication, General Packet Radio Service (GPRS), enhanced data rates for GSM evolution (EDGE), DCS, PDC, PCS, code division multiple access (CDMA), wideband-CDMA, CDMA2000, Universal Mobile Telecommunications System (UMTS), 3GPP LTE ($3^{rd}$ Generation Partnership Project Long Term Evolution) and/or 3GPP LTE-A (LTE Advanced). For example, GSM operation can include reception/transmission in frequency ranges of about 824 MHz to about 849 MHz and about 869 MHz to about 894 MHz. EGSM operation can include reception/transmission in frequency ranges of about 880 MHz to about 914 MHz and about 925 MHz to about 960 MHz. DCS operation can include transmission/reception in frequency ranges of about 1710 MHz to about 1785 MHz and about 1805 MHz to about 1880 MHz. PDC operation can include transmission in frequency ranges of about 893 MHz to about 953 MHz and about 810 MHz to about 885 MHz. PCS operation can include transmission/reception in frequency ranges of about 1850 MHz to about 1910 MHz and about 1930 MHz to about 1990 MHz. 3GPP LTE operation can include transmission/reception in frequency ranges of about 1920 MHz to about 1980 MHz and about 2110 MHz to about 2170 MHz. Other Radio Access Technologies and/or frequency bands can also be used in embodiments according to the invention.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, if used herein, the common abbreviation "e.g.", which derives from the Latin phrase exempli gratia, may be used to introduce or specify a general example or examples of a previously mentioned item, and is not intended to be limiting of such item. If used herein, the common abbreviation "i.e.", which derives from the Latin phrase id est, may be used to specify a particular item from a more general recitation.

Exemplary embodiments were described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit such as a digital processor, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments were disclosed herein, in connection with the following description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

For purposes of illustration and explanation only, various embodiments of the present invention were described herein in the context of user equipment (e.g., "wireless user terminal(s)", "wireless communication terminal(s)", "wireless terminal(s)", "terminal(s)", "user terminal(s)", etc.) that are configured to carry out cellular communications (e.g., cellular voice and/or data communications). It will be understood, however, that the present invention is not limited to such embodiments and may be embodied generally in any wireless communication terminal that is configured to transmit and receive according to one or more RATs. Moreover, "user equipment" is used herein to refer to one or more pieces of user equipment. Acronyms "UE" and "UEs" may be used to designate a single piece of user equipment and multiple pieces of user equipment, respectively.

As used herein, the term "user equipment" includes cellular and/or satellite radiotelephone(s) with or without a multi-line display; Personal Communications System (PCS) terminal(s) that may combine a radiotelephone with data processing, facsimile and/or data communications capabilities; Personal Digital Assistant(s) (PDA) or smart phone(s) that can include a radio frequency transceiver and a pager, Internet/Intranet access, Web browser, organizer, calendar and/or a global positioning system (GPS) receiver; and/or conventional laptop (notebook) and/or palmtop (netbook) computer(s) or other appliance(s), which include a radio frequency transceiver. As used herein, the term "user equipment" also includes any other radiating user device that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). Finally, the terms "node" or "base station" includes any fixed, portable and/or transportable device that is configured to communicate with one or more user equipment and a core network, and includes, for example, terrestrial cellular base stations (including microcell, picocell, wireless access point and/or ad hoc communications access points) and satellites, that may be located terrestrially and/or that have a trajectory above the earth at any altitude.

In the drawings and specification, there have been disclosed embodiments of the invention and, although specific terms are employed, they are used in a generic and descriptive sense only and not for purposes of limitation, the scope of the invention being set forth in the following claims.

The invention claimed is:

1. A method of assigning radio resources for wireless communication with user equipment, comprising:
   assigning the user equipment to one of a first group of radio resources that does not provide coordinated multipoint (CoMP) transmission or to a second group of radio resources that is nonoverlapping with the first group and that provides CoMP transmission, depending on mobility of the user equipment,
   wherein the radio resources are Long Term Evolution (LTE) radio resources, wherein the first group of radio resources comprises a first group of carriers having a first Reference Signal (RS) pattern per antenna and wherein the second group of radio resources comprises a second group of carriers that is different than the first group and having a second RS pattern per antenna that is sparser than the first RS pattern, and
   wherein assigning the user equipment to one of a first group of radio resources or to a second group of radio resources depending on the mobility of the user equipment comprises assigning the user equipment to the first group if the user equipment is mobile and assigning the user equipment to the second group if the user equipment is stationary.

2. A method according to claim 1 wherein the first and second groups of radio resources are nonoverlapping in time, frequency and/or code.

3. A method according to claim 1 wherein the first and second groups of radio resources include first and second different pilot symbol densities, link adaptation and/or scheduling algorithms.

4. A method according to claim 1 wherein assigning the user equipment to one of a first group of radio resources or to a second group of radio resources comprises assigning the user equipment to one of the first group, to the second group or one or more other groups of radio resources that are nonoverlapping with the first and second groups, depending on the mobility of the user equipment.

5. A method according to claim 1 further comprising:
   reassigning the user equipment to one of the second group or to the first group in response to a change in the mobility of the user equipment.

6. A method according to claim 1 wherein assigning the user equipment to one of a first group of radio resources or to a second group of radio resources depending on the mobility of the user equipment comprises assigning the user equipment to the first group if the user equipment is stationary and assigning the user equipment to the second group if the user equipment is mobile.

7. A method according to claim 6 further comprising:
   reassigning the user equipment to the second group in response to the user equipment becoming mobile; and
   retaining the user equipment in the second group in response to the user equipment becoming stationary.

8. A method according to claim 1 wherein assigning the user equipment to one of a first group of radio resources or to a second group of radio resources depending on the mobility of the user equipment comprises assigning the user equipment to the first group if the user equipment is stationary and a radio channel over which communication with the user equipment occurs is stable in time, and assigning the user equipment to the second group if the user equipment is mobile or the radio channel is varying in time.

9. A method according to claim 1 wherein assigning the user equipment to one of a first group of radio resources or to a second group of radio resources comprises:
   assigning the user equipment to one of the first group of radio resources and to a first signal processing algorithm, or to the second group of radio resources that is nonoverlapping with the first group and to a second signal processing algorithm that includes different parameters than the first signal processing algorithm, depending on the mobility of the user equipment; and/or
   assigning the user equipment to one of the first group of radio resources and a signal processing algorithm including first input parameters, or to the second group of radio resources that is nonoverlapping with the first group and to the signal processing algorithm including second input parameters that are different from the first input parameters, depending on the mobility of the user equipment.

10. A method according to claim 1 wherein the radio resources are Long Term Evolution (LTE) radio resources, wherein the first group of radio resources comprises a first link adaptation and/or scheduling algorithm based on average channel knowledge and the second group of radio resources comprises a second link adaptation and/or scheduling algorithm based on instantaneous channel knowledge.

11. A method according to claim 10 wherein a first user equipment has a strong estimated channel gain on a first carrier frequency and a weak estimated channel gain on a second carrier frequency, and a second user equipment has a weak estimated channel gain on the first carrier frequency and a strong estimated channel gain on the second carrier frequency, and wherein the first and second user equipment are scheduled in a same time slot at their strong carrier frequency if the first and second user equipment are stationary, but not if the first or second user equipment is mobile.

12. A method according to claim 1 wherein assigning the user equipment to one of a first group of radio resources or to a second group of radio resources depending on the mobility of the user equipment comprises assigning the user equipment to one of the first group or to the second group depending on an expected mobility of the user equipment.

13. A method according to claim 12 wherein the expected mobility is dependent upon a position of the user equipment.

14. A method according to claim 1 further comprising:
communicating with the user equipment using the radio resources that were assigned.

15. A method according to claim 1 wherein the second group of radio resources provides joint CoMP transmission to transmit signals to one of the user equipment from multiple transmitters.

16. A node of a wireless communication system comprising:
a radio transceiver that is configured to communicate with user equipment; and
a processor that is configured to assign the user equipment to one of a first group of radio resources of the radio transceiver that does not provide coordinated multipoint (CoMP) transmission or to a second group of radio resources of the radio transceiver that is nonoverlapping with the first group and that provides CoMP transmission, depending on the mobility of the user equipment,
wherein the radio resources are Long Term Evolution (LTE) radio resources, wherein the first group of radio resources comprises a first group of carriers having a first Reference Signal (RS) pattern per antenna and wherein the second group of radio resources comprises a second group of carriers that is different than the first group and having a second RS pattern per antenna that is sparser than the first RS pattern, and
wherein the processor is configured to assign the user equipment to the first group if the user equipment is mobile and to assign the user equipment to the second group if the user equipment is stationary.

17. A node according to claim 16 wherein the first and second groups of radio resources are nonoverlapping in time, frequency and/or code.

18. A node according to claim 16 wherein the first and second groups of radio resources include first and second different pilot symbol densities, link adaptation and/or scheduling algorithms.

19. A node according to claim 16 wherein the processor is further configured to assign the user equipment to one of the first group, to the second group or to one or more other groups of radio resources that are nonoverlapping with the first and second groups, depending on the mobility of the user equipment.

20. A node according to claim 18 wherein the processor is configured to assign the user equipment to one of the first group of radio resources and to a first signal processing algorithm, or to the second group of radio resources that is nonoverlapping with the first group and to a second signal processing algorithm that includes different parameters than the first signal processing algorithm, depending on the mobility of the user equipment; and/or
wherein the processor is configured to assign the user equipment to one of the first group of radio resources and a signal processing algorithm including first input parameters, or to the second group of radio resources that is nonoverlapping with the first group and to the signal processing algorithm including second input parameters that are different from the first input parameters, depending on the mobility of the user equipment.

21. A node according to claim 16 wherein the second group of radio resources of the radio transceiver provides joint CoMP transmission to transmit signals to one of the user equipment from multiple transmitters.

22. A wireless user equipment comprising:
a radio transceiver; and
a processor that is configured to communicate with a node of a wireless communications system using one of a first group of radio resources of the radio transceiver that does not provide coordinated multipoint (CoMP) transmission or using a second group of radio resources of the radio transceiver that is nonoverlapping with the first group and that provides CoMP transmission, depending on the mobility of the user equipment,
wherein the radio resources are Long Term Evolution (LTE) radio resources, wherein the first group of radio resources comprises a first group of carriers having a first Reference Signal (RS) pattern per antenna and wherein the second group of radio resources comprises a second group of carriers that is different than the first group and having a second RS pattern per antenna that is sparser than the first RS pattern, and
wherein the processor is configured to communicate with the node of the wireless communications system using the first group if the user equipment is mobile and to communicate with the node of the wireless communications system using the second group if the user equipment is stationary.

23. A wireless user equipment according to claim 22:
wherein the processor is further configured to communicate with the node using one of the first group of radio resources and a first signal processing algorithm, or with the second group of radio resources that is nonoverlapping with the first group and a second signal processing algorithm that includes different parameters than the first signal processing algorithm, depending on the mobility of the user equipment; and/or
wherein the processor is configured to communicate with the node using one of the first group of radio resources and a signal processing algorithm including first input parameters, or with the second group of radio resources that is nonoverlapping with the first group and with the signal processing algorithm including second input parameters that are different from the first input parameters, depending on the mobility of the user equipment.

24. A wireless user equipment according to claim 22 wherein the radio resources are Long Term Evolution (LTE) radio resources, and wherein the first group of radio resources comprises a first link adaptation and/or scheduling algorithm based on average channel knowledge and the second group of radio resources comprises a second link adaptation and/or scheduling algorithm based on instantaneous channel knowledge.

25. A wireless user equipment according to claim 22 wherein the second group of radio resources of the radio transceiver provides joint CoMP reception to receive signals at the wireless user equipment from multiple transmitters.

* * * * *

UNITED STATES PATENT AND TRADEMARK OFFICE
CERTIFICATE OF CORRECTION

| | | |
|---|---|---|
| PATENT NO. | : 9,124,391 B2 | Page 1 of 1 |
| APPLICATION NO. | : 14/512654 | |
| DATED | : September 1, 2015 | |
| INVENTOR(S) | : Medbo et al. | |

It is certified that error appears in the above-identified patent and that said Letters Patent is hereby corrected as shown below:

In the specification

Column 8, Line 25, delete "Configured" and insert -- configured --, therefor.

Column 8, Line 51, delete "at leas" and insert -- at least --, therefor.

Signed and Sealed this
Twenty-fourth Day of May, 2016

Michelle K. Lee
*Director of the United States Patent and Trademark Office*